US007711396B2

(12) United States Patent
Kim

(10) Patent No.: US 7,711,396 B2
(45) Date of Patent: May 4, 2010

(54) MOBILE COMMUNICATION TERMINAL AND OPERATING METHOD THEREOF

(75) Inventor: Ji Tae Kim, Seoul (KR)

(73) Assignee: LG Electronics Inc, Seoul (KR)

( * ) Notice: Subject to any disclaimer, the term of this patent is extended or adjusted under 35 U.S.C. 154(b) by 1204 days.

(21) Appl. No.: 11/280,096

(22) Filed: Nov. 16, 2005

(65) Prior Publication Data

US 2006/0121766 A1 Jun. 8, 2006

(30) Foreign Application Priority Data

Nov. 19, 2004 (KR) ............... 10-2004-0095077

(51) Int. Cl.
*H04M 1/00* (2006.01)
(52) U.S. Cl. ............ 455/575.1; 455/575.3; 379/433.01; 379/433.03; 379/433.04; 379/433.07; 379/433.13
(58) Field of Classification Search ............. 455/575.1, 455/575.3
See application file for complete search history.

(56) References Cited

U.S. PATENT DOCUMENTS

| 5,485,517 | A | 1/1996 | Gray | |
|---|---|---|---|---|
| 6,549,789 | B1 * | 4/2003 | Kfoury | .............. 455/550.1 |
| 6,980,735 | B2 * | 12/2005 | Horiguchi | .............. 396/429 |
| 7,330,547 | B2 * | 2/2008 | Turcanu | .............. 379/433.07 |
| 2003/0228847 | A1 | 12/2003 | Matsumoto | |
| 2004/0048633 | A1 * | 3/2004 | Sato et al. | .............. 455/556.1 |
| 2004/0198460 | A1 * | 10/2004 | Sakuta et al. | .............. 455/566 |
| 2005/0287953 | A1 * | 12/2005 | Ikeda et al. | .............. 455/66.1 |
| 2006/0003818 | A1 * | 1/2006 | Navntoft et al. | .......... 455/575.3 |
| 2006/0135228 | A1 * | 6/2006 | Kato | .............. 455/575.4 |

FOREIGN PATENT DOCUMENTS

| CN | 2398776 | 9/2000 |
|---|---|---|
| CN | 1414767 | 4/2003 |
| GB | 2 070 392 | 9/1981 |
| JP | 06-326658 | 11/1994 |
| KR | 10-2002-00031284 A | 5/2002 |
| KR | 10-2004-0080009 A | 9/2004 |
| KR | 2004-80213 | 9/2004 |
| KR | 10-2005-0072880 A | 7/2005 |

* cited by examiner

*Primary Examiner*—Vincent P Harper
*Assistant Examiner*—Mazda Sabouri
(74) *Attorney, Agent, or Firm*—Workman Nydegger

(57) ABSTRACT

A mobile communication terminal and operating method thereof. The terminal includes a housing configured such that one portion of the housing can rotate against the other portion of the housing. A joint mutually joins an upper housing with a lower housing of the mobile communication terminal and enables one of the upper and lower housings to be obliquely twisted to rotate against the other. After providing an input signal to the mobile communication terminal having thus joined, twisting to rotate either the upper or lower housing against either the lower or upper housing in one direction obliquely orients a microphone near a user's mouth. Twisting the upper and/or lower housing also sends the input signal to a base station automatically.

20 Claims, 9 Drawing Sheets

MOBILE COMMUNICATION TERMINAL AND OPERATING METHOD THEREOF

CROSS-REFERENCE TO RELATED APPLICATIONS

This application claims the benefit of the Korean Application No. 10-2004-0095077 filed on Nov. 19, 2004, which is hereby incorporated by reference.

BACKGROUND OF THE INVENTION

1. Field of the Invention

The present invention relates to a mobile communication terminal. More particularly, embodiments of the invention relate to a mobile communication terminal with a housing having rotatable portions and to operating methods thereof.

2. Discussion of the Related Art

Recently, technological developments in mobile communication terminals or devices such as mobile phones, personal digital assistants (PDAs) and the like, provide users with a robust experience that includes much more than just the ability to talk. Character information, image information, games, network access and other capabilities are readily available for use. Recently, mobile communication terminals include an audio player capable of playing back audio files such as MP3 files. Mobile communication terminals are also equipped with a digital camera that is able to capture digital photos and videos. As a result, mobile communication terminals provide a range of functions above simple voice communication and are becoming increasingly integrated with everyday life.

Meanwhile, as mobile communication terminals become more functional, their design become more important. Conventional mobile communication terminals have various designs. For example, mobile communication terminals are designed as simple bar type terminals, folding or clamshell type terminals configured to open/close by turning a pair of housings centering on a hinge, and a slide type communication terminal that opens/closes by sliding a pair of housings.

The bar type communication terminal, compared to other communication terminals, has the advantage of having a simple structure and good portability due in part to its size. Yet the speaker and microphone of a bar type communication terminal are essentially aligned on a straight line. As a result, the speaker and microphone of the bar type communication terminal are not both optimally placed in the vicinity of a user's ear and mouth at the same time. What is needed is a mobile communication terminal that better meets a user's needs.

SUMMARY OF THE INVENTION

These and other limitations are overcome by embodiments of the invention, which relate to a reconfigurable mobile communication terminal and to methods of operating the mobile communication terminal. One embodiment of the mobile communication terminal has a structural configuration that can be modified such that a speaker and microphone can adhere closely to a user's ear and mouth, respectively, while talking over the terminal. The structure or the terminal can be used to transmit or receive a signal as well.

For example, one embodiment of the mobile communication terminal includes an upper housing and a lower housing that can be rotated with respect to each other. The interface between the upper housing and the lower housing is preferably tilted such that rotating one of the upper or lower housing changes the shape of the terminal. In a first position, for instance, the upper housing and the lower housing together resemble a bar type device. When the lower or upper housing is rotated against the other to a second position, the upper housing is then obliquely positioned.

The first position, when the upper and lower housings are not mutually rotated, corresponds to the upper and lower housing being aligned on a straight line. In the second position, when mutually rotated, the upper and lower housings are obliquely joined. Typically, either the upper or lower housing is rotated against the other on a length directional center line of the housing.

In one embodiment, a joint that mutually connects the upper housing with the lower housing enables one of the upper or lower housing to be obliquely twisted to rotate against the other. As a result, the mobile communication terminal can be rotated between two positions as described above. The lower housing typically includes a microphone on both a front side and a rear side. Thus, when the lower housing is rotated about 180 degrees against the upper housing, the microphone on the rear side is placed in the vicinity of a user's mouth. The upper housing may also include a display on the front side and/or the rear side. The upper housing may also include a camera module that is controlled, for example, with a key located on a lateral side of the lower housing.

The joint includes a lower joint having an extension projecting from the lower housing. A head is formed flat and wide at an end of the extension. The joint also includes an upper joint having a ring type joint housing connected to the upper housing, a receiving portion provided within the joint housing to allow the head to be rotatably inserted therein, and at least one protrusion protruding from a lower end of the joint housing to prevent the head from escaping from the receiving portion.

The joint may also include an opening in the center so that wires connecting parts within the upper and lower housings can pass through the joint. In order to prevent the upper or lower housing from being rotated excessively, the joint further includes a partition plate in the upper joint. The partition plate prevents the lower joint from being rotated against the upper joint in one direction by an angle exceeding 180°. In one example, the partition plate separates the receiving portion into two separate spaces. The lower joint has a pair or corresponding heads that are received in the two separate spaces, respectively. As a result, the lower or upper housing can be rotated no more than 180 degrees.

Operating the mobile communication terminal may include the step of inputting a signal to the mobile communication terminal having a keypad. Next, either the upper or lower housing is twisted to rotate against either the lower or upper housing in one direction obliquely. Rotating the terminal in this manner can automatically send the signal to a base station. Then, the method further includes the step of performing interactive communications with the base station sequentially after completion of rotating either the upper or lower housing.

When the communication is finished or for another reason, a user may perform the steps of twisting to rotate either the upper or lower housing against either the lower or upper housing in an opposite direction and awaiting a signal of the base station. In other words, the rotation of either the upper or lower housing is reversed to end the communication in one example.

When an incoming signal is received by the device, a method of operating a mobile communication terminal includes the steps of twisting to rotate either the upper or lower housing against either the lower or upper housing in one direction obliquely and performing interactive communications with the base station sequentially. In this case, the incoming signal can be automatically displayed one at least one of the displays of the device.

The method further includes the steps of twisting to rotate either the upper or lower housing against either the lower or upper housing in a direction reverse to the one direction and awaiting a signal of the base station. This step is usually performed when the communication is terminated or ending.

It is to be understood that both the foregoing general description and the following detailed description of embodiments of the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Embodiments of the invention relate to communication terminals and more particularly to reconfigurable mobile communication terminals. Embodiments of the invention include a mobile communication terminal with first and second housings that are rotatably connected. In a first position, the terminal resembles a bar type communication terminal. Rotating one of the housings with respect to the other housing of the mobile communication terminal changes the relative location of either the upper or lower housing such that the upper and lower housing are obliquely joined. By including, for example, a microphone on both sides of the lower housing, rotating the terminal can place the microphone on the rear side of the lower housing in a closer vicinity to a user's mouth.

Reference will now be made in detail to the preferred embodiments of the present invention, examples of which are illustrated in the accompanying drawings. Wherever possible, the same reference numbers will be used throughout the drawings to refer to the same or like parts.

Figure 1:
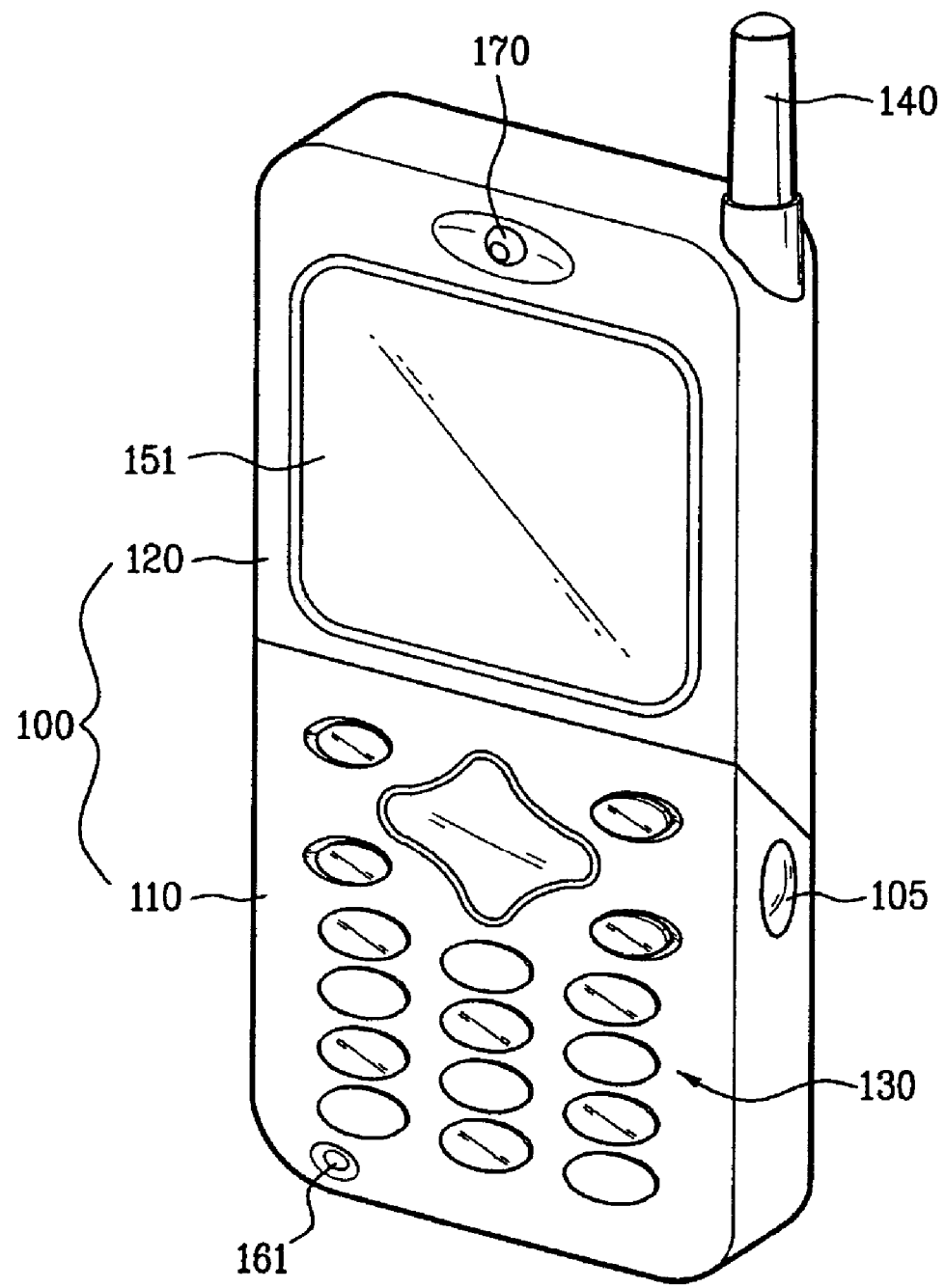
FIG. 1 is a perspective diagram of a mobile communication terminal according to a first embodiment of the present invention.
Figure 2:
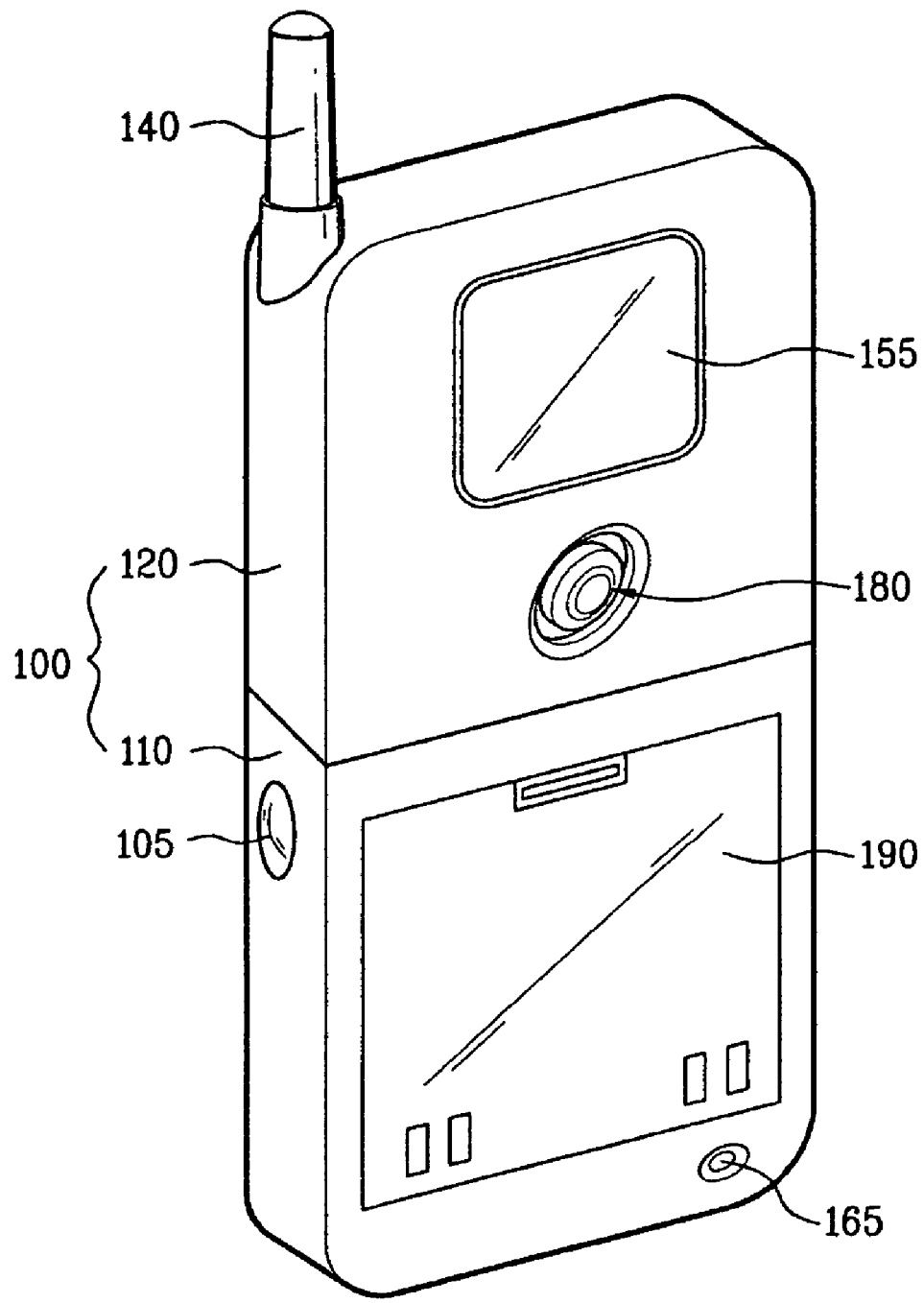
FIG. 2 is a perspective diagram of the mobile communication terminal in FIG. 1, in which a backside of the terminal is shown.
Figure 3:
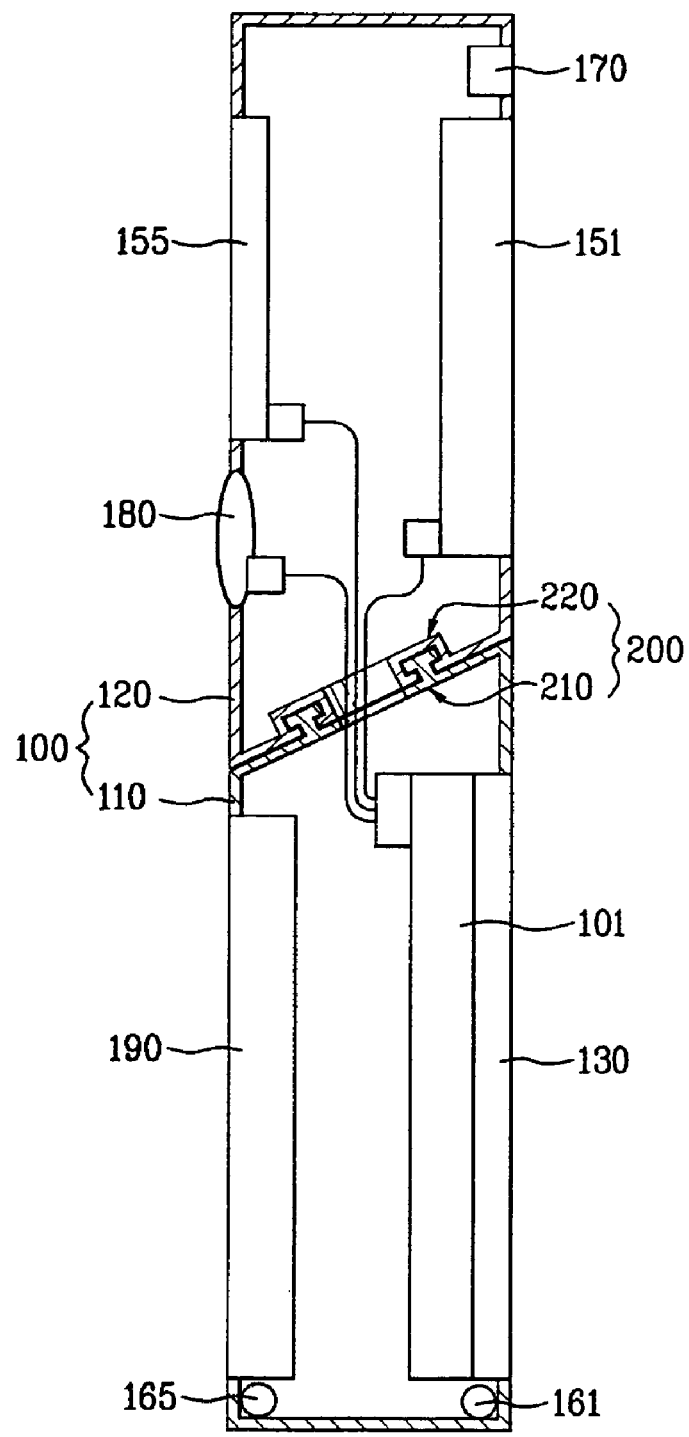
FIG. 3 is a schematic cross-sectional diagram of the mobile communication terminal in FIG. 1, in which an internal structure of the terminal is shown.

FIGS. 1 through 3 illustrate a mobile communication terminal according to one embodiment of the present invention. The terminal shown in FIGS. 1 through 3 includes a housing 100. The housing 100 includes an upper housing 120 and a lower housing 110. The upper housing 120 and the lower housing 110 are connected with a joint 200. The joint 200 enables the upper housing 120 and the lower housing 110 to mutually twist or rotate such that the upper housing 120 is rotatably joined to the lower housing 110.

The terminal illustrated in FIGS. 1-3 includes an input/output unit used, for example, to input or output a signal. The input/output unit includes, by way of example, a keypad 130, microphones 161 and 165, a speaker 170, displays 151 and 155 and a battery 190. In this example, the keypad 130, the microphones 161 and 165 and the battery 190 are included in the lower housing 110. The speaker 170 and the displays 151 and 155 are included in the upper housing 120.

Specifically, the keypad 130 is placed in a front side of the lower housing 110, the speaker 170 is located in a front side of the upper housing 120, and the battery 190 is located in a rear side of the lower housing 110. Optionally, one microphone 161 or 165 and one display 151 or 155 may suffice. Preferably, embodiments of the present invention include both of the microphones 161 and 165 and both of the displays 151 and 155 for the user's convenience.

The microphone 161 is located in the front side of the lower housing 110 and the microphone 165 is located or placed at the rear side of the lower housing 110. Because the microphones 161 and 165 are located on opposite sides of the lower housing 110, communications are enabled no matter how the lower housing 110 is turned or rotated against the upper housing 120. As discussed in more detail later in this specification, the lower housing 110 can be rotated with respect to the upper housing 120. The display 151 is placed or located in the front side of the upper housing 120 and the display 155 is located or placed in the rear side of the upper housing 120.

Optionally, a camera module 180 can be provided to the housing 100. The camera module 180, as shown in FIG. 2 and FIG. 3, is located in the rear side of the upper housing 120 in this example. A key 105, as shown in FIGS. 1-2, for controlling the camera module 180, is placed on or in at least one of both lateral sides of the lower housing 110. One of skill in the art can appreciate that the camera module 180 can be controlled using the keypad 130 provided to the front side of the lower housing 110.

Meanwhile, a mobile communication signal processing unit of the terminal shown in FIGS. 1-3 enables communications of signals with a base station. The mobile communication signal processing unit includes a transmitting/receiving circuit. In the transmitting/receiving circuit, a transmission signal processing unit transmits information inputted via the input/output unit and a reception signal processing unit receives for processing a radio wave from outside. An antenna 140 both transmits a radio wave carrying a signal processed by the transmission signal processing unit and receives the radio wave. The transmitting/receiving circuit is mounted on a main board 101, as shown in FIG. 3 and is typically located within the lower housing 110. One of skill in the art can appreciate that various portions of the input/output unit as well as the transmitting/receiving circuit can be located in one or both of the upper housing 120 or the lower housing 110.

The above-explained configuration of an exemplary mobile communication terminal includes the housing 100 provided with an input/output unit, the displays 151 and 155, the camera module 180, the mobile communication signal processing unit, the main board 101 having various control circuits mounted thereon and the battery 190.

In one preferred embodiment, one of the upper housing 120 and the lower housings 110 of the housing 100 of the mobile communication terminal is rotatable against the other. The housing 100 of the mobile communication terminal according to the present invention has a unique structure characterized in that one of the upper housing 120 and the lower housings 110 can be twisted against the other to be rotated. A joint 200 illustrated in FIG. 3, for example, between the upper housing 120 and the lower housing 110 joins the upper housing 120 and the lower housing 110 to each other. The shape and/or angle of the interface between the upper housing 120 and the lower housing 110, is explained in more detail as follows.

With further reference to FIGS. 1-3, the interface between the upper housing 120 and the lower housing 110 in the mobile communication terminal according to one embodiment of the present invention is tilted against a plane parallel to the housing 100. And, the joint 200, which includes at least one lower joint 210 and an at least one upper joint 220 is positioned at a center of the tilted interface between the upper housing 120 and the lower housing 110.

Figure 5A:
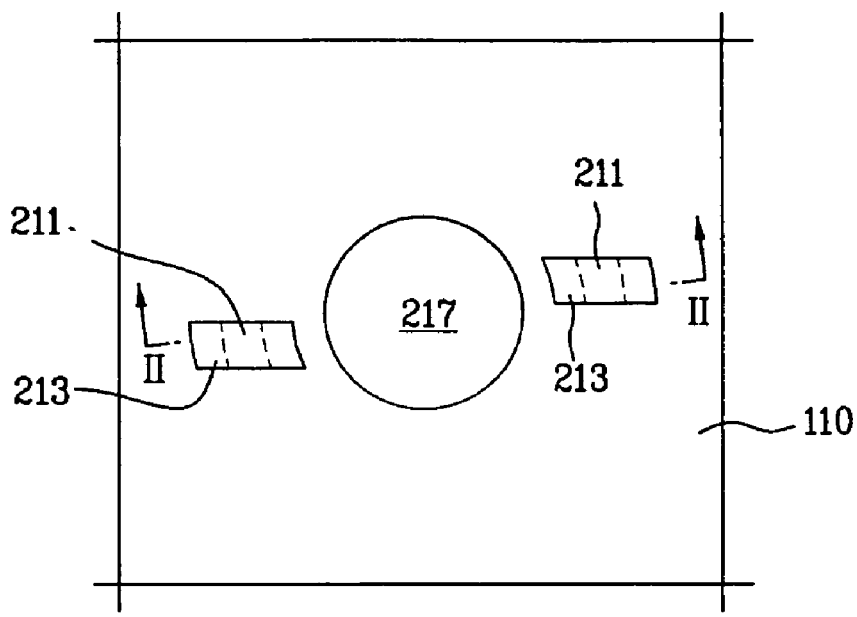
FIG. 5A and FIG. 5B are cross-sectional diagrams of a lower joint of a housing of the mobile communication terminal in FIG. 1.
Figure 5B:
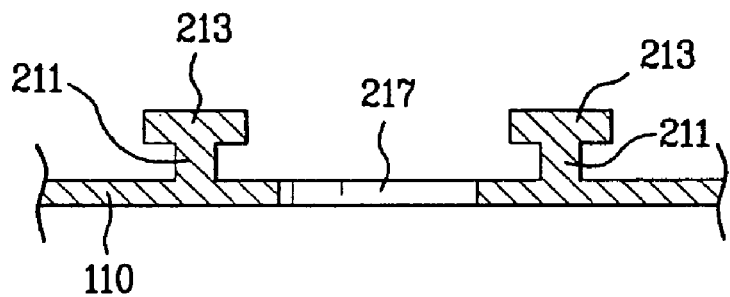

The lower joint 210, as shown in FIG. 3, projects from the lower housing 110. In this example, the lower joint 210, as shown in FIGS. 5A and 5B, includes a pair of extensions 211. And, each of a pair of the extensions 211 of the lower joint 210 projects upward from a topside of the lower housing 110. A head 213 formed flat and wide at an upper end of the extension 211. FIGS. 5A and 5B illustrate that the lower joint 210 includes a pair of opposing extensions on opposite sides of an opening 217 in one embodiment.

Figure 4A:
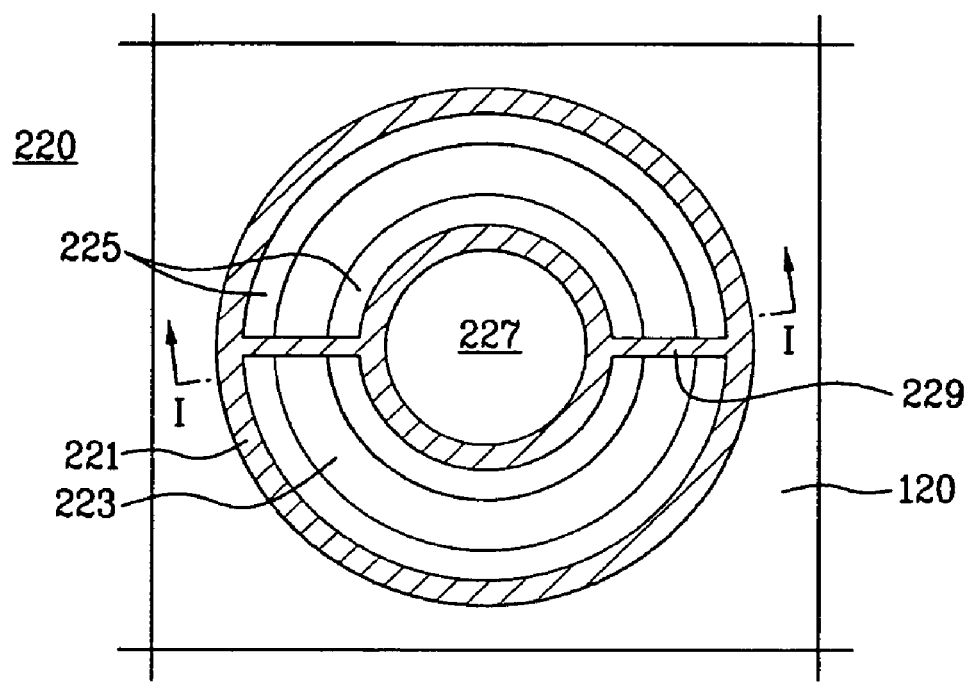
FIG. 4A and FIG. 4B are cross-sectional diagrams of an upper joint of a housing of the mobile communication terminal in FIG. 1.
Figure 4B:
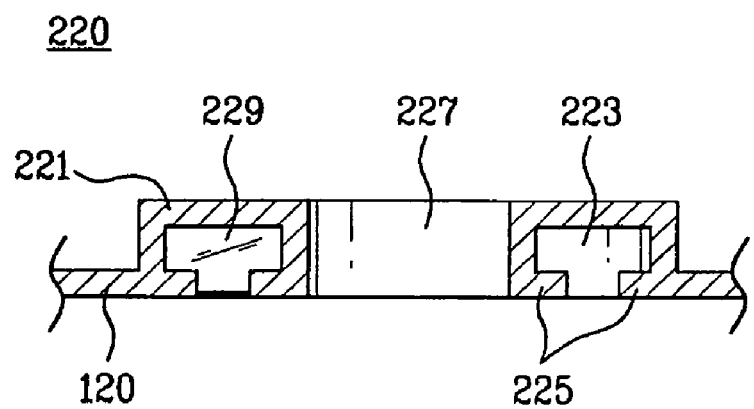

The upper joint 220, as shown in FIG. 3, is connected to the upper housing 120 and allows the lower joint 210 to be rotatably fitted in an inside of the upper joint 220. In this example, a ring type joint housing 221, as shown in FIGS. 4A and 4B, is connected to the upper housing 120. A joint housing 221 of the upper joint 220 also includes a receiving portion 223, in which the head(s) 213 of the lower joint 210 is rotatably inserted. At least one protrusion 225 protruding inward is provided to a lower end of the lower housing 110. In the example illustrated in FIGS. 4A and 4B, a pair of protrusions 225 protrude from both lower ends of the lower housing 110 toward an inside of the joint housing 221 to confront each other. The protrusions 225 prevent the heads 213 from escaping from the receiving portion 223.

Meanwhile, the upper housing 120 and the lower housing 110, as shown in FIG. 3, are each provided with various electric parts that are connected to each other through the joint 200. In one embodiment, the electric parts installed within the upper housing 120, e.g., the first display 151, the second display 155, the speaker 170, the camera module 180 and the like are connected to the main board 101 provided within the lower housing 110 or the battery 190 through a path, via which wires connecting the parts pass through.

In one example, opening 217 in the lower joint 210 and opening 227 in the upper joint 220 form the path of the wires. The openings 217 and 227 are situated in a center of the joint 200 in the housing 100 of the present invention. The openings 217 and 227 are configured to perforate the joint 200 in a vertical direction. In this example, the opening 227 is formed at a center of the ring type joint housing 221 and the other opening 217 is formed at a center of the lower joint 20.

Once the openings 217 and 227 for the path of the wires are provided to the center of the joint 200, one of the upper and lower housings 120 and 110 can be freely rotated against the other. Yet, if the upper housing 120 and the lower housing 110 are permitted to continue rotating against each other in only one direction, the wires passing through the openings 217 and 227 will be twisted and be cut or torn away from the electric parts inside the housing 100. Thus, the wires passing through the joint 200 should be prevented from being twisted as described when one of the upper and lower housings 120 and 110 is rotated against the other.

In one embodiment, one of the upper housing 120 and the lower housing 110 of the housing 100 is configured to rotate in one direction against the other within a predetermined angle only. Specifically, the lower housing 110 can rotate up to 180° only in one direction against the upper housing 120. The lower housing 110 is unable to rotate to an angle above 180°. Hence, in case of attempting to return to the lower housing 110 to its original position after having been rotated by 180°, the lower housing 110 needs to be rotated by 180° in the reverse direction against the upper housing 120.

In order for the lower housing 110 to be rotated to no more than 180° against the upper housing 120 in one direction, at least one partition plate 229 is included in the joint 200. FIGS. 4A and 4B illustrate the at least one partition plate 229 in the upper joint 220. In this instance, a pair of partition plates 229 are included in the upper joint 220 within the joint housing 221 to partition the receiving portion 223 into two separate spaces. A pair of heads 213 included in the lower joint 210 are installed to be received in the separate spaces within the receiving portion 223, respectively. With such a configuration, the lower joint 210 is unable to rotate against the upper joint 220 in one direction by an angle exceeding 180°. In other words, the lower joint 210 of the lower housing 110 can rotate by 180° against the upper housing 120 in either direction connected to the upper joint 220 in one direction. The partition plates 229 prevent the lower housing from being excessively rotated in one direction against the upper housing. The partition plates 229 serve as a stop to the extensions 211 of the lower joint and ensure that the lower housing is not rotated more than 180 degrees.

A process of twisting to rotate one of the upper and lower housings 120 and 110 against the other in the above-configured mobile communication terminal is explained in detail with reference to FIGS. 6 and 7 as follows.

Before the lower housing 110 is rotated against the upper housing 120, the housing 100, as shown in FIGS. 1 through 3, has a bar type shape. In the bar type shape or in this position, the upper housing 120 and the lower housing 110 are aligned on one straight line while the speaker 170, the first display 151, the keypad 130 and the first microphone 161 are aligned on the same plane as well. If a user is talking over the terminal without rotating the lower housing 110 against the upper housing 120, the first microphone 161 is used in inputting the user's voice to the terminal.

Figure 6:
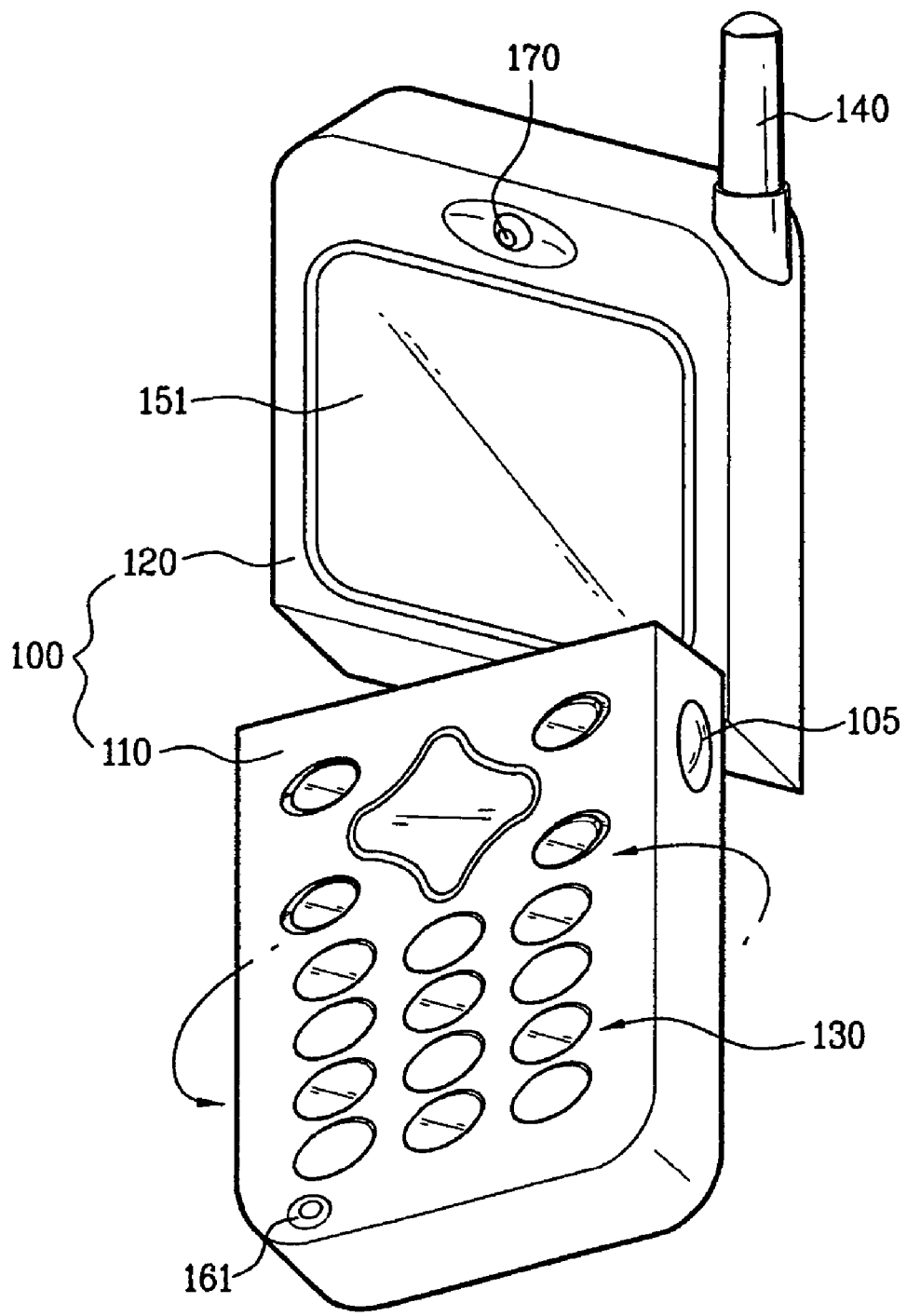
FIG. 6 is a perspective diagram of the mobile communication terminal in FIG. 1, in which a lower housing of the terminal is turned against an upper housing.

As shown in FIG. 6, the lower housing 120 is twisted or rotated in a width direction of the housing 100. The interface and/or the joint 200 between the upper housing 120 and the lower housing 110 provides stability to the terminal during rotation. The lower housing 110 is rotated centering on a central axis of the joint 200 which is vertical to the tilted interface between the upper housing 120 and the lower housings 110. In this case, the wires, which are installed to pass through the openings 217 and 227, avoid interrupting the rotation of the lower housing 110.

Figure 7:
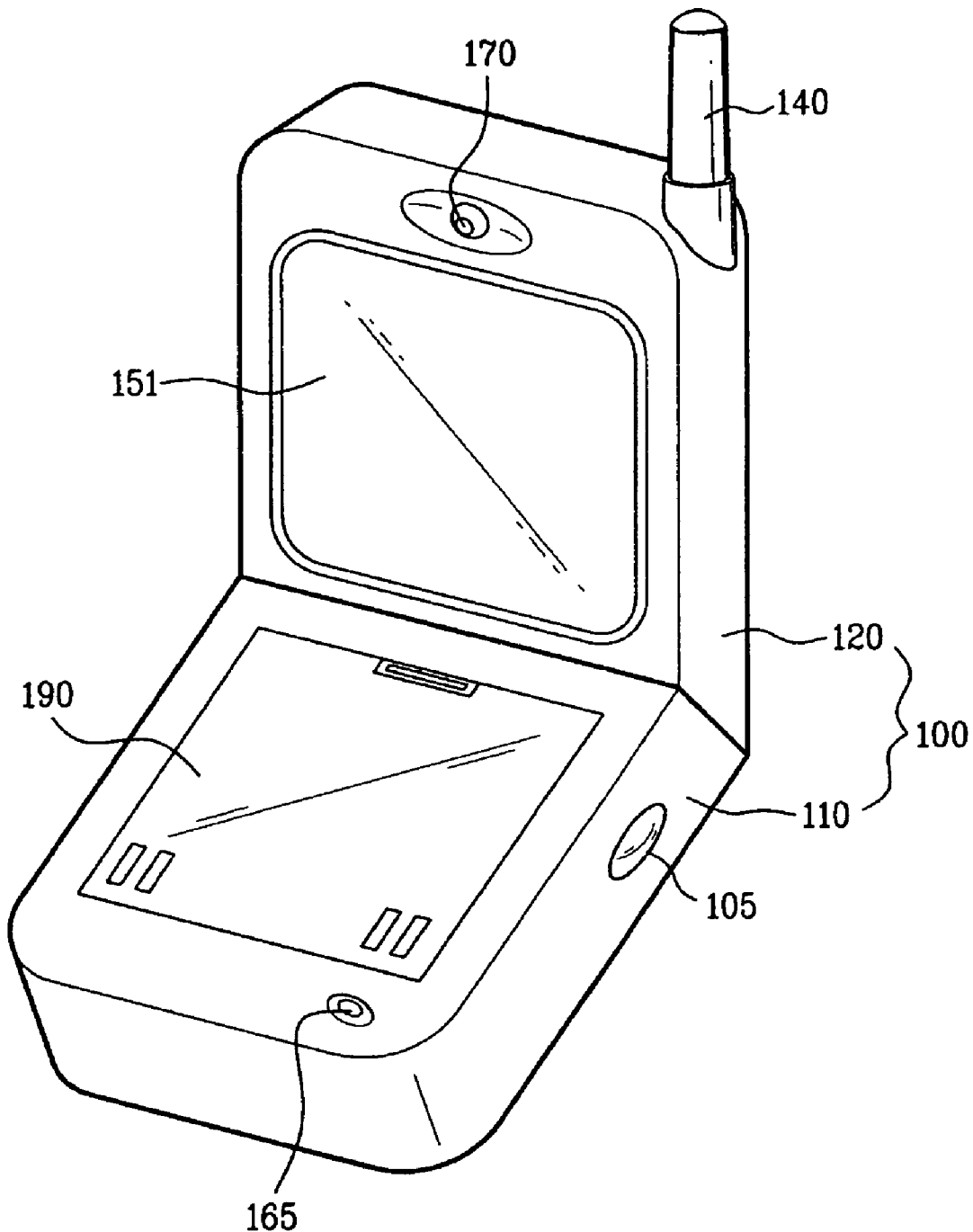
FIG. 7 is a perspective diagram of the mobile communication terminal in FIG. 1, in which a lower housing of the terminal is completely turned against an upper housing.

Once the lower housing 110 is rotated against the upper housing 120 by about 180° to a second position, the upper and lower housings 120 and 110, as shown in FIG. 7, are joined to each other obliquely or in a tilted configuration. When rotated in this fashion, the speaker 170 and first display 151 of the upper housing 120 and the battery 190 and second microphone 165 on rear side of the lower housing 110 are situated on the front side of the housing 100. When a user is talking over the terminal while the lower housing 110 is rotated as shown in FIG. 7, the second microphone 165 is used in inputting user's voice. Since the lower housing 110 is joined to the upper housing 120 on the tilt or according to the interface between the lower housing 110 and the upper housing 120, the second microphone 165 is situated in the vicinity of a user's mouth. Thus, the mobile communication terminal according to the present invention solves the problem of the general bar type terminal as previously described, i.e., the unavailability of the microphone in the vicinity of the user's mouth.

If the rotation of the lower housing 110 is reversed after having been rotated against the upper housing 120 by 180° as shown in FIG. 7, the lower housing 110 and the upper housing 120, as shown in FIG. 1, are aligned on one straight line again and the housing 100 again has a bar type configuration.

The mobile communication terminal described herein can transmit/receive signals when the terminal is in a state or configuration such that one of the upper and lower housings 120 and 110 is not rotated against the other, i.e., in a state shown in FIGS. 1 to 3. For instance, in case of sending a message or making an outgoing call, a signal is input to the housing 100 using the keypad 130 and a send or call button is then pressed. In case of receiving a message or call, a confirmation or call button is pressed once a signal is received. Such an operating method of the terminal is the same as the operating method of a conventional bar type terminal. However, the operating method of the mobile terminal according to embodiments of the present invention is not limited to the above-explained method, but further provides a unique operating method different from the conventional method of a bar type terminal. An operating method of a mobile communication terminal according to the present invention is explained with reference to FIGS. 8A and 8B as follows.

Figure 8A:
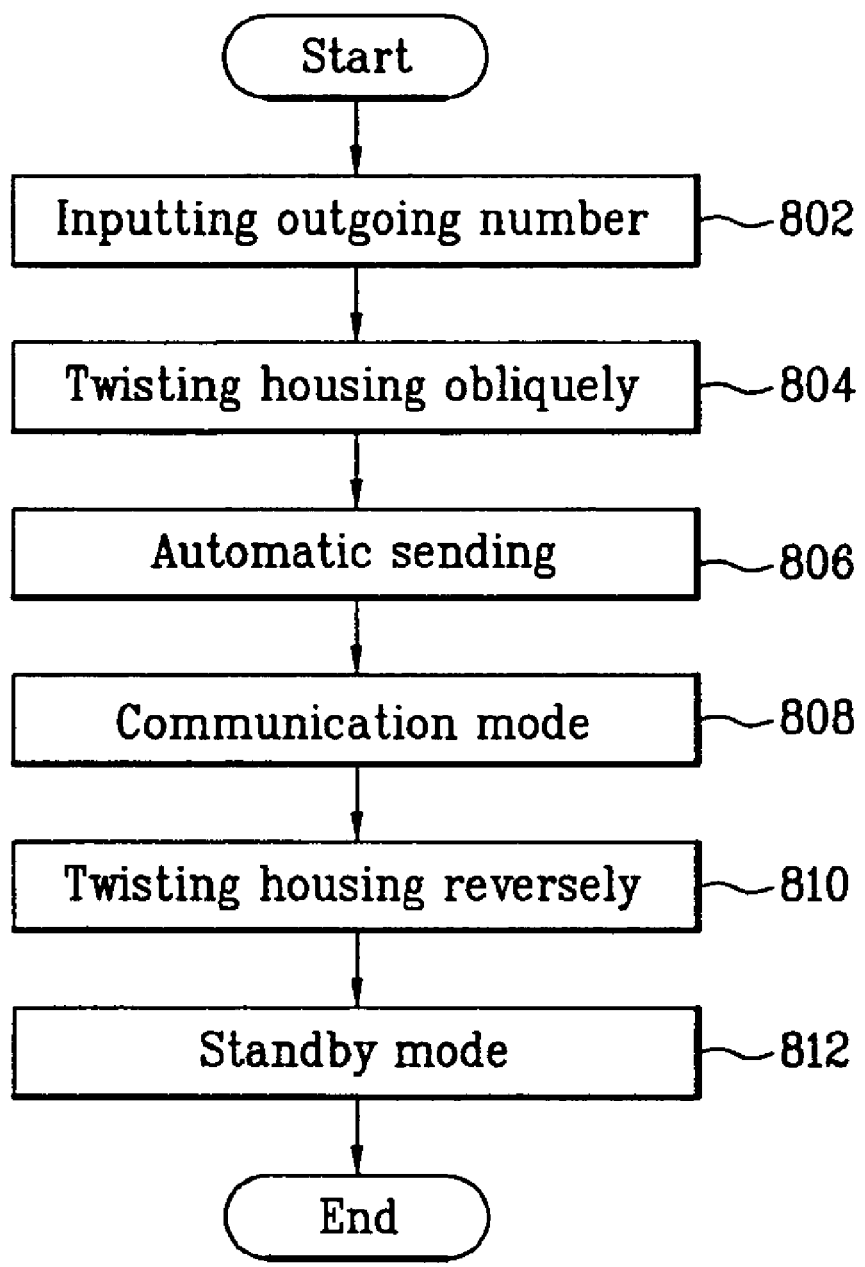
FIG. 8A is a flowchart of an exemplary method of transmitting a signal using a mobile communication terminal.

In case of sending a message or making an outgoing call, a signal is input to the housing 100 of the mobile communication terminal using, for example, the keypad. When sending a message, both a message and an outgoing number are provided or input to the terminal. When making an outgoing call, an outgoing number is input. After inputting 802 the input signal or number, the lower housing 110 (or the upper housing 120), as shown in FIG. 8A, is twisted 804 to rotate against the upper housing 120 by 180° in one direction. When the lower and/or upper housing is obliquely rotated in this manner, the mobile communication terminal automatically sends 806 the signal or number input to the housing 100 to a base station. When sending the message, the input message is automatically sent to the base station as soon as the lower housing 110 is rotated. When making an outgoing call, the outgoing number is automatically sent to the base station as soon as the lower housing 110 is rotated. When the call is connected, the mobile communication terminal enters a communication mode 808 and sequentially performs interactive communications with the base station to enable a user to communicate with a called party.

In the case of sending the message, the communication mode 808 of the mobile communication terminal is then switched to a standby mode for receiving a signal after sending the message. After the call is completed, a user may press an end button to complete the communications. In one example, the mobile communication terminal may enter a standby mode for awaiting a signal. One of skill in the art can appreciate that a process of entering the standby mode after completion of the message sending or communication is not limited to the above-explained process.

For instance, after a communication is completed or a message is sent, a user, can twist 810 the lower housing 110 against the upper housing 120 in the reverse direction When rotating the housing in this manner, the communications are ended by the rotation of the lower housing 110 and the mobile communication terminal enters a standby mode 812. In the standby mode, the terminal may, by way of example, await a signal from a base station.

Figure 8B:
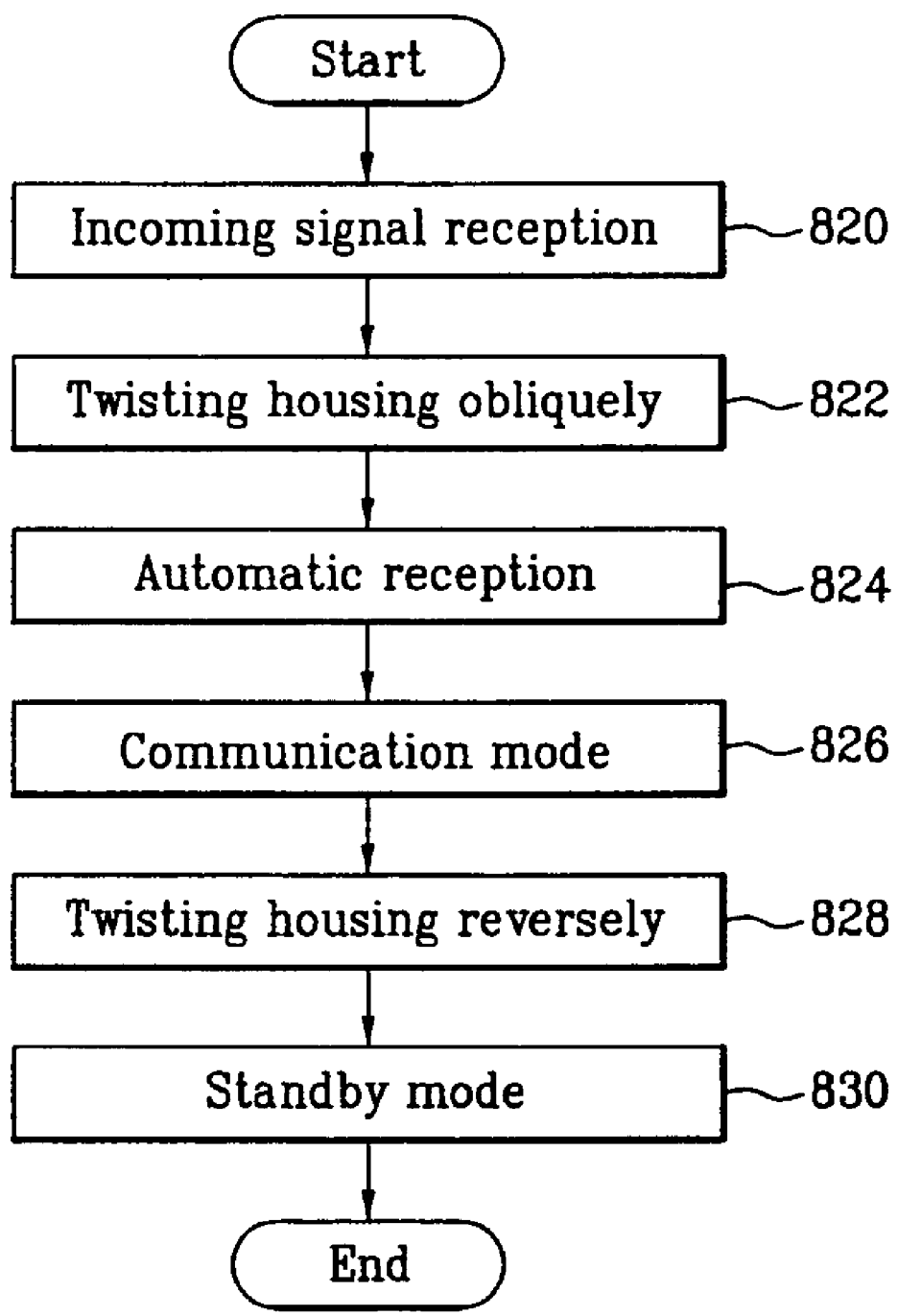
FIG. 8B is a flowchart of an exemplary method of receiving a signal using a mobile communication terminal.

FIG. 8B illustrates an exemplary method for receiving a message or for receiving an incoming call using the mobile communication terminal described herein. In this example, the mobile communication terminal receives 820 an incoming signal from a base station. The mobile communication terminal typically generates sound, vibration or light to inform a user that the signal is being received.

Then, the user twists 822 to rotate the lower housing 110 and/or the upper housing 120 in one direction in order to rotate the lower housing 110 against the upper housing 120 to automatically receive 822 the incoming signal, such as receiving a message or answering the phone. The terminal can then enter a communication mode 826. If the incoming communication is a message, the received message is output to at least one of the displays 151 and 155, e.g., the first display 151 by the rotation of the lower housing 110. And, if the terminal is ringing for an incoming call, the mobile communication terminal sequentially performs interactive communications with the base station so that the user can communicate with a calling party.

After checking the contents of the message or finishing talking over the terminal, the terminal can be twisted 828 by rotating the lower housing 110, the lower housing 110 in the opposite direction to the former direction. Rotating the housing in this manner causes, in one embodiment, the mobile communication terminal to switch to a standby mode 830 for awaiting a signal from the base station.

As explained in the foregoing description, the mobile communication terminal according to the present invention has the unique configuration that one of the upper and lower housings is rotated against the other, thereby meeting various consumer's demands for new terminal designs.

And, in case that the interface between the upper and lower housings is tilted on the plane parallel to the housing, the lower and upper housings are joined to each other on the tilted interface. Rotating the lower housing against the upper housing changes the configuration of the terminal. Hence, while talking over the terminal, the speaker of the upper housing and the microphone of the lower housing can be situated in the vicinity of user's ear and mouth, respectively and a user can more conveniently talk over the terminal.

Moreover, twisting or rotating the lower housing against the upper housing can cause the signal input by the user to be sent. When the rotation of the lower housing against the upper housing is reversed, the terminal is switched to the standby mode. When the terminal receives an incoming signal, twisting the lower housing against the upper housing also causes the message to be displayed or so that a user can answer the call. Subsequently, rotating or twisting the lower housing in the reverse direction against the upper housing causes the terminal to enter the standby mode. Therefore, the present invention provides the unique operating method of the mobile communication terminal and meets the consumer's demand for the new terminals.

In the above description, embodiments of the invention are adapted to a bar type mobile communication terminal and are described in detail. However, it will be apparent to those skilled in the art that various modifications and variations can be made in the present invention. Thus, it is intended that the present invention covers the modifications and variations of this invention that are within the scope of the appended claims and their equivalents.

What is claimed is:

1. A mobile communication terminal comprising:
   a housing having an upper housing and a lower housing; and
   a joint that mutually joins the upper housing with the lower housing such that at least one of the upper housing and the lower housing is configured to be obliquely twisted to rotate about an interface formed between the upper housing and the lower housing, wherein the joint further includes:
      a lower joint connected on the lower housing, wherein the lower joint comprises at least one extension projecting from the lower housing, the extension having at least one head formed flat and wide at an end of the extension; and
      an upper joint connected on the upper housing, wherein the lower joint fits at least partially inside the upper joint, and wherein the upper joint further comprises a ring type joint housing connected to the upper housing, the ring type joint housing comprising:
         a receiving portion to allow the at least one head to be rotatably inserted therein; and
         at least one protrusion protruding from a lower end of the ring type joint housing to prevent the at least one head from escaping from the receiving portion;
      wherein the upper joint further comprises at least one partition plate provided within the ring type joint housing to partition the receiving portion into a first space and separate a second space and wherein the lower joint comprises a first head and a second head to be received in the first space and the second space, respectively.

2. The mobile communication terminal of claim 1, wherein either the upper or lower housing is rotated against either the lower or upper housing centering on a length-directional center line of the housing.

3. The mobile communication terminal of claim 1, wherein either the upper or lower housing is twisted to rotate against either the lower or upper housing along a width direction of the housing.

4. The mobile communication terminal of claim 1, wherein the interface between the upper and lower housings is tilted against a plane parallel to the housing.

5. The mobile communication terminal of claim 1, wherein the upper housing and the lower housing are aligned on a straight line and wherein the upper housing is obliquely joined to the lower housing when mutually rotated.

6. The mobile communication terminal of claim 1, wherein the upper housing includes a first display in a front side of the upper housing.

7. The mobile communication terminal of claim 1, wherein the upper housing includes a second display in a rear side of the upper housing.

8. The mobile communication terminal of claim 1, wherein the lower housing includes a first microphone located in a front side of the lower housing.

9. The mobile communication terminal of claim 1, wherein the lower housing includes a second microphone located a rear side of the lower housing.

10. The mobile communication terminal of claim 9, wherein the interface between the upper housing and the lower housing is tilted against the housing to enable the second microphone to be situated in the vicinity of a user's mouth when the lower housing is rotated against the upper housing such that the lower housing is obliquely joined to the upper housing.

11. The mobile communication terminal of claim 1, the upper housing comprising a camera module provided to a front or rear side.

12. The mobile communication terminal of claim 11, the lower housing further comprising at least one key provided to a lateral side of the lower housing for controlling the camera module.

13. The mobile communication terminal of claim 1, wherein the lower housing is rotatable against the upper housing in at least one direction by 180°.

14. The mobile communication terminal of claim 1, wherein the lower joint is formed in the lower housing and projects upward from the lower housing; and wherein the upper joint is formed in the upper housing to allow the lower joint to be rotatably fitted in at least partially inside of the upper joint.

15. The mobile communication terminal of claim 1, wherein the joint further comprises an opening perforating a center of the joint so that wires connecting parts within the upper housing and the lower housing can pass through the opening of the joint.

16. The mobile communication terminal of claim 14, the upper joint further comprising at least one partition plate to prevent the lower joint from being rotated against the upper joint in one direction by an angle exceeding 180°.

17. A mobile communication terminal comprising:
   an upper housing having first electric parts disposed therein, wherein the upper housing further comprises:
      a first display on a front side; and
      a second display on a rear side; and a camera module;
   a lower housing having second electric parts disposed therein, wherein an interface between the lower housing and the upper housing is tilted such that the upper housing and the lower housing are configured to twist to mutually rotate between a first position and a second position, wherein the lower housing further comprises:
      a keypad;
      a first microphone on a front side; and
      a second microphone on a rear side, wherein the second microphone is situated in a closer vicinity of a user's mouth when the lower housing is in the second position than the first microphone when the lower housing is in the first position; and
   a joint formed at the tilted interface and rotatably connecting the upper housing and the lower housing, wherein the joint further comprises:
      an upper joint formed on the upper housing, the upper joint having a ring type joint that includes a partition plate; and
      a lower joint formed on the lower housing and having at least one extension formed thereon, each extension having a head that is received into the ring type joint, wherein the partition plate provides a stop for the at least one extension such that the lower housing cannot be rotated more than 180 degrees with respect to the upper housing.

18. The mobile communication terminal of claim 17, wherein the upper housing and the lower housing form a bar type device when in the first position and wherein the upper housing and the lower housing form an oblique angle when in the second position.

19. The mobile communication terminal of claim 18, wherein an input signal is automatically sent to a base station when the lower housing and the upper housing are rotated from the first position to the second position.

20. The mobile communication terminal of claim 17, the upper joint having a first opening and the lower joint having a second opening such that wires connecting electric parts in the upper housing with electric parts in the lower housing pass through the first opening and the second opening.

* * * * *